July 3, 1956
H. T. SHERWIN
2,752,797
ROPE GRIPPING DEVICE
Filed Oct. 22, 1953
2 Sheets-Sheet 1
FIG. 1.
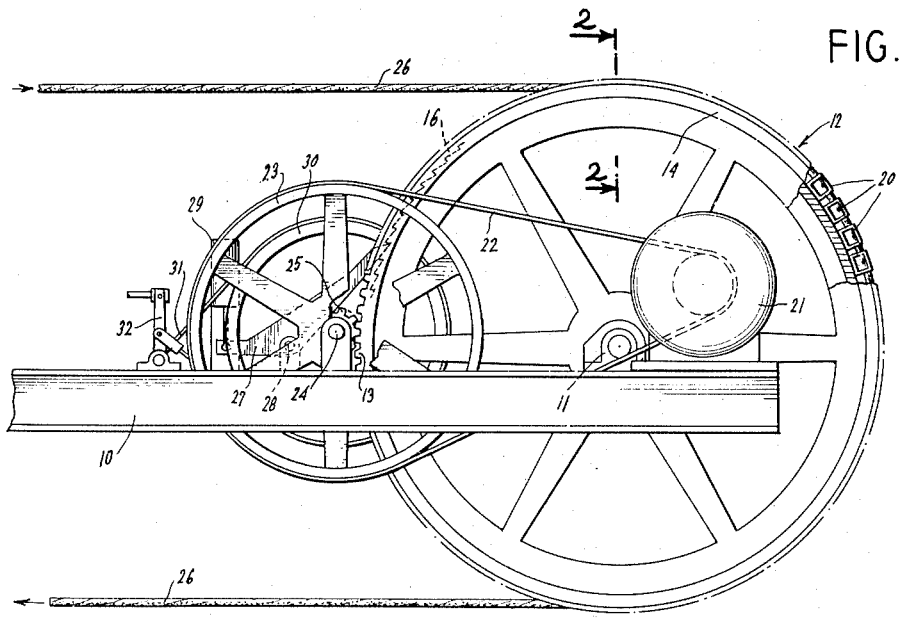
FIG. 3.
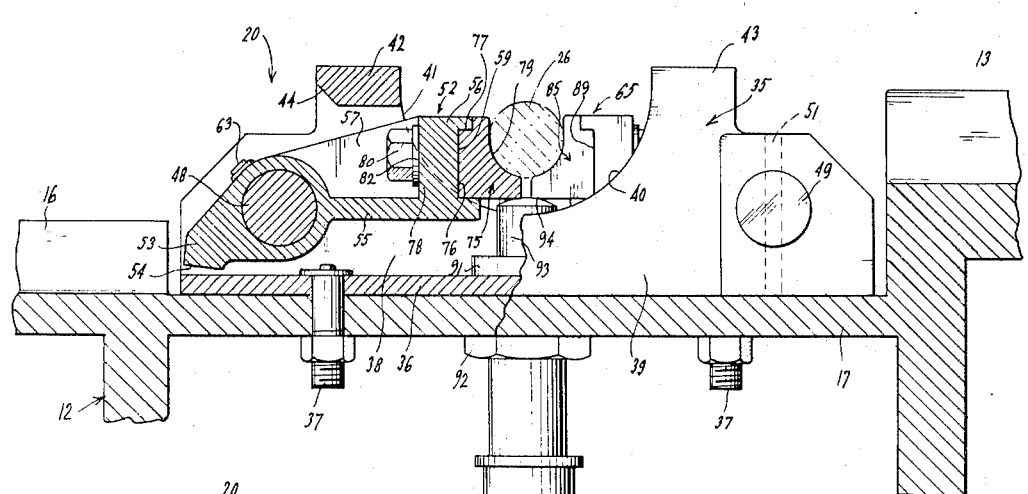
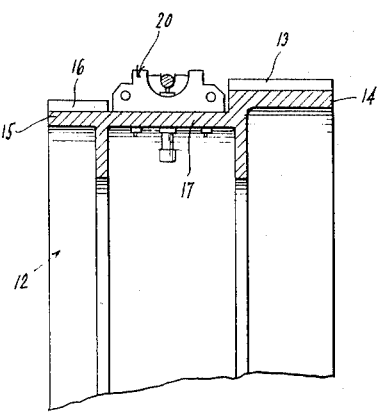
FIG. 2.
INVENTOR
Howard T. Sherwin
BY Moser, Rhum
ATTORNEYS July 3, 1956  H. T. SHERWIN  2,752,797
ROPE GRIPPING DEVICE
Filed Oct. 22, 1953  2 Sheets-Sheet 2

INVENTOR
Howard T. Sherwin
BY Mock-Blum
ATTORNEYS

# United States Patent Office 2,752,797
Patented July 3, 1956

2,752,797
ROPE GRIPPING DEVICE

Howard T. Sherwin, Springfield, N. J., assignor to Interstate Equipment Division Yara Engineering Corporation Application October 22, 1953, Serial No. 387,762

5 Claims. (Cl. 74—230.24)

The present invention relates generally to gripping devices, and is particularly directed to rope gripping devices of the type adapted for use with a wheel having a rope trained thereover.

The particular embodiment of the present invention, which is illustrated in the drawings and which will be described hereinafter in greater detail, comprises generally a pair of jaw members movable toward and away from each other, a jaw lining removably secured to each jaw member and movable therewith between gripping and releasing positions, and means resiliently urging the jaw lining toward their releasing position, an article to be gripped being movable between the jaw linings to move the latter to their gripping position.

In prior gripping devices of the type described, it was necessary to form integral gripping jaws, and provide the latter with eccentric mountings which were adjustable to compensate for normal wear of the gripping faces. Such adjustment required removal of the entire gripping device from the wheel or table, which was a laborious and time consuming operation. Further, in such prior devices, when the working faces were worn beyond compensation by adjustment, it was necessary to remove and replace an entire jaw.

Accordingly, it is a principal object of the present invention to provide a simple and efficient means to compensate for normal wear of the working faces in a gripping device.

It is another object of the present invention to provide a gripping device of the type described in which normal wear may be compensated for by the removal and replacement of the gripping faces without removal of the entire gripping device or even the entire gripping jaw. Thus, the working faces may be quickly and easily removed and replaced to substantially reduce upkeep costs and assure proper maintenance.

It is another object of the present invention to provide a gripping device of the type described in which the gripping faces are adapted to abuttingly engage with their associated jaw members, and thereby transmit the gripping force reaction to the jaw members. By this novel feature, the present invention permits the use of less expensive material for fabrication of the working faces.

It is still another object of the present invention to provide a gripping device having the characteristics mentioned above in which a fastener is adapted to hold the working face in proper position with respect to the jaw member in such a manner that the fastener will be free of any reaction force resulting from the gripping action. By reason of this novel construction, a simple threaded fastener may be advantageously employed as the threads thereof will not be subjected to any undue stresses.

It is yet another object of the present invention to provide a gripping device of the type described in which the necessity for eccentric jaw mountings is obviated, and wherein bearing pins may be employed having relatively large diameters, and hence greater bearing area.

It is a further object of the present invention to provide a gripping device of the type described which is simple in construction and durable in operation, which is effective for its intended purposes, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 1 is a side elevational view showing a tramway drive including the gripping device of the present invention;

Fig. 2 is a sectional view taken substantially along the line 2—2 of Fig. 1 and showing the gripping unit of the present invention;

Fig. 3 is a view similar to Fig. 2, greatly enlarged, and partially cut away along the line 3—3 of Fig. 5;

Figure 4:
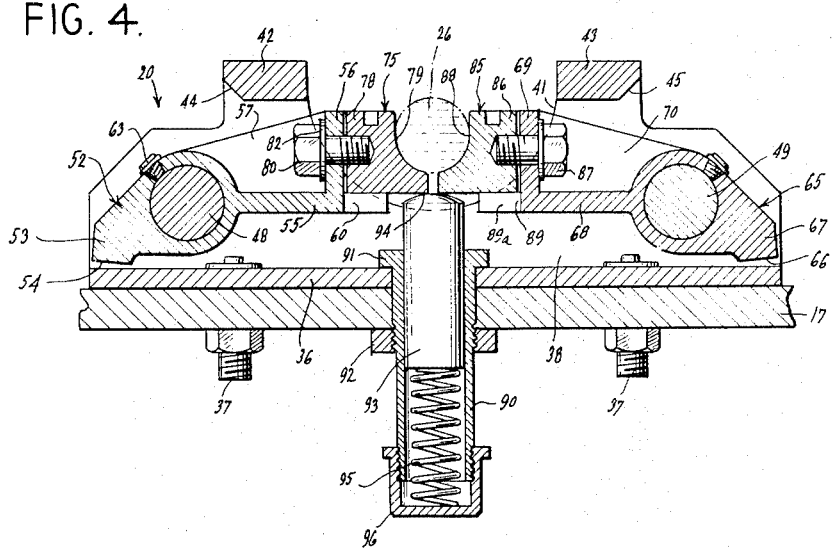
Fig. 4 is a sectional elevational view similar to Fig. 3 and taken along the line 4—4 of Fig. 5.

Referring now more particularly to the drawings, and specifically to Fig. 1 thereof, the tramway drive illustrated therein comprises a supporting structure or beam 10, upon which are mounted pillow blocks 11 for rotatably supporting a drive wheel, generally designated 12. The drive wheel 12 is provided with circumferential gear teeth 13 adjacent to one side 14; and, adjacent to the other side 15 of the drive wheel are provided circumferential ratchet teeth 16. On the central rim portion 17 intermediate the gear teeth 13 and ratchet teeth 16, and arranged about the periphery of the drive wheel 12, are a plurality of rope gripping units, generally designated 20 and adapted to grip the rope 26.

Also mounted on the supporting structure 11 is a driving motor 21 which drives a belt 22 to turn a sheave or pulley 23, the latter being keyed on a rotatable supporting shaft 24. A gear or pinion 25 is also keyed or otherwise fixed on the shaft 24 and in meshing engagement with the gear teeth 13 of the drive wheel 12 to effect rotative movement of the latter in a clockwise direction as viewed in Fig. 1.

An air operated pawl 27 is rotatably supported as at 28 and operatively connected to the air cylinder 29, the pawl being engageable with the ratchet teeth 16 of the drive wheel 12 to prevent rotative movement of the latter in a counter-clockwise direction. A brake wheel 30 is also mounted on the shaft 24 for rotation therewith, and is engaged by a brake band 31 which is connected to the operating link 32 for braking the rotative movement of the shaft 24, and, hence, of the tramway rope 26.

Figure 5:
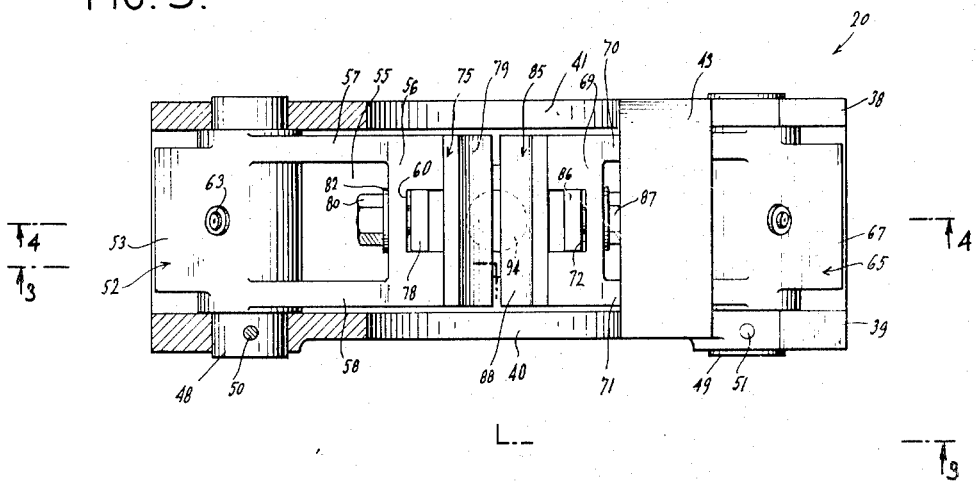
Fig. 5 is a top plan view, partly broken away, showing the gripping device of the present invention.
Figure 6:
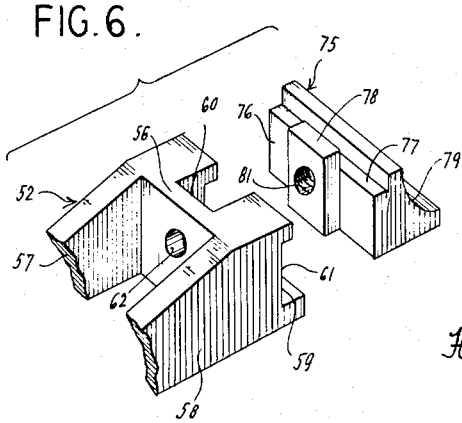
Fig. 6 is an exploded, perspective view showing the mode of connection preferred between the jaw members and jaw linings.

Referring now to Figs. 3, 4 and 5, wherein the gripping unit 20 is shown in greater detail, such unit includes a channel 35 arranged transversely with respect to the central portion 17 of the wheel perimeter or rim. The channel is formed with a web portion 36 arranged in face to face abutting engagement with the central wheel rim portion 17 and fixedly secured thereto as by bolts, 37, 37. On opposite sides of the channel web 36 are provided spaced upstanding side walls 38, and 39, each formed with an inwardly extending arcuate cutout 40 and 41 for spacedly receiving the rope 26. Extending between the channel side walls 38 and 39, on opposite sides of the cutout portions 40 and 41, are a pair of bridge-like stop members 42 and 43 which have their under surfaces chamfered as at 44 and 45, and which serve to rigidify and strengthen the channel 35.

A pair of parallel spaced journal pins 48 and 49 extend across the channel 35 and through the channel side walls 38 and 39 outwardly of the bridging elements 42 and 43. The pins 48 and 49 are fixed with respect to the channel walls 38 and 39 by the roll pins 50 and 51 inserted through the wall 39 and the adjacent portions of the bearing pins.

On the pin 48 is rotatably supported a jaw member 52 which has one end extending outwardly, as at 53 and formed with an abutment surface 54 adapted to engage the upper surface of the channel web 36 and limit rotative movement of the jaw member 52 in one direction. The major portion of the jaw member 52 extends inwardly as at 55 and includes an end wall 56 and spaced strengthening webs 57 and 58. The end wall 56 has its end face formed with a substantially rectangular open end groove 59, and an open ended slot or cutout 60 extends transversely of the groove 59 and inwardly beyond the bottom wall 61 of the latter. Thus, the cutout 60, is substantially rectangular in shape and deeper than the groove 59. A smooth bore 62 extends through the end wall 56 and opens into the cutout portion 60. A grease fitting 63 may be provided for lubricating the bearing surfaces of the pin 48 and jaw member 52.

A jaw member 65 is rotatably supported on the bearing pin 49. The construction of the jaw member 65 is identical to that of the jaw member 52, described above, includes an abutment surface 66 on one end 67, the main portion of the jaw member extending toward the center of the channel 35 as at 68, and including an end wall 69 and strengthening webs 70 and 71. The end wall 69 has its end face provided with an open ended groove 89 and a rectangular, open ended cutout 72 extending inwardly through the bottom wall 89a of the groove 89.

A jaw lining or face piece 75 is adapted to be carried on the end wall 56 of the jaw member 52. The jaw ceiling 75 has one face 76 formed with a shoulder 77 and a rectangular boss 78, the shoulder 77 permitting the lining 75 to be conformably received in the groove 59 with the face 76 in abutting engagement with the bottom wall 61 of the groove. Further, the rectangular boss 78 extends conformably into the cutout 60, and is preferably spaced from the bottom wall of the latter. It will be observed that the groove 59 prevents relative movement of the lining 75 in one direction, while the cutout 60, receiving the boss 78, prevents relative movement of the lining in the other direction. Hence, it will be apparent that when the jaw lining 75 is in the above described abutting engagement with the end wall 56 of the jaw member 52, that movement of the lining is completely prevented. The face 79 of the lining 75, remote from the jaw member 52, is concavely curved, for reasons which will soon become apparent.

When the jaw lining 75 is seated in conformably abutting engagement with the end wall 56 of the jaw member 52, a headed fastener or bolt 80 may be extended through the bore 62, in spaced relation thereto, and threadedly engaged in the bore 81 of the boss 78. A lock washer 82 is preferably circumposed about the bolt 80 intermediate the head of the latter and the end wall 56. The bolt 80 may then be tightened to draw the liner 75 into abutting engagement with the bottom wall 61 of the groove 59, the boss 78 being preferably spaced from the bottom wall of the cutout 60 to insure abutting engagement of the case 76 with the bottom wall 61 of the groove 59. It will now be apparent that any force imparted to the lining 75 will be transmitted directly to the jaw member 52 and will not be imparted to the bolt 80, as the latter is spaced from the jaw member.

In the identical manner, a jaw lining or face piece 85 is adapted to be conformably received in the groove 89 of the jaw member 65 in abutting engagement with the groove bottom wall 89a. A boss 86 is provided on the lining 85 and conformably engages the cutout portion 72 of the jaw member 65, to completely prevent movement of the jaw lining with respect to the jaw member. A headed bolt 87 extends spacedly through the end wall 69 of the jaw member 65 and is threadedly engageable in the boss 86 of the lining 85 to hold the lining in abutting engagement with the bottom wall 71 of the groove 70. The lining 85 is also formed with a concave surface 88 remote from the jaw member 65, the concave surfaces 88 and 79 combining to open outwardly for receiving the rope 26 or other articles to be gripped.

Extending centrally through the web 36 of the channel 35 and the adjacent rim portion of the wheel 12 is a tubular plunger guide 90 which has a flange 91 on one end abutting the outer surface of the channel web. A lock nut 92 is threadedly engaged about the plunger guide 90 and abuts the underside of the wheel rim portion 17 to fixedly position the plunger guide. Slidably mounted in the plunger guide 90 is a plunger 93 having one end 94 curved, flat or other suitable shape and normally held in abutting engagement with the undersides of the jaw linings 75 and 85 by the action of a helical compression spring 95. A cap 96 is secured over the inner end of the plunger guide 90 and engages the spring 95 to maintain the latter in compression.

It will now be understood that the jaw linings 75 and 85 are movable about the axes of the pins 48 and 49 along arcuate paths which are approximately tangent to each other. Thus, the jaw linings are movable from the illustrated position either radially outwardly and away from each other, or radially inwardly and away from each other, stated otherwise, the jaw linings are movable from outward position away from each other to an intermediate position adjacent to each other, and are movable further inwards to a position away from each other. During normal operation, the jaw linings will move only between an outer position away from each other and the intermediate position of the drawings, the latter being the rope gripping position and the former the rope releasing position. That is, the spring pressed plunger 93 will normally urge the jaw linings 75 and 85 outwards to a position limited by engagement of the abutment surfaces 54 and 56 with the adjacent surface of the channel web 36. The rope will be received in the outwardly opening groove defined by the lining surfaces 79 and 88 and will move the linings inwardly against the force of the plunger 93 to the intermediate gripping position of the drawings.

It will also be understood that the reaction force of the gripping action will be transmitted from the jaw linings 75 and 85 to the jaw members 52 and 65 by abutting engagement therebetween. Further, the bolts 80 and 87 will be free of this reaction force as they extend spacedly through the end walls 56 and 69.

In order to remove the jaw linings, it is only necessary to insert a suitable tool inwardly beneath one of the bridging elements 42 or 43 and remove the adjacent one of the bolts 80 or 87. Of course, this is done when the particular gripping unit 20 is clear of the rope 26, which is for approximately 180° of the wheel 12. When the bolt is removed, the jaw lining may be manually displaced from its abutting engagement with the associated jaw member and a new jaw lining may be substituted therefor. If desired, the end cap 96 may be removed to withdraw the spring 95 and plunger 93 and thus allow the jaw members to swing inwardly into engagement with the web 36 of the channel 35. This will afford increased accessibility to the bolts 80 and 87 by the insertion of a tool along one of the chamfered surfaces 44 or 45. Hence, the jaw linings may be easily and quickly replaced without removing the entire gripping unit, by the mere withdrawal of a single bolt.

It will also be observed that the present invention permits the use of relatively large diameter bearing pins 48 and 49, thereby providing increased bearing area to withstand the reaction force of the gripping pressure.

From the foregoing it is seen that the present invention fully accomplishes its intended objects, and provides a device which is well adapted to meet practical conditions of use.

Although the present invention has been described in some detail by way of illustration and example for purposes of clarity of understanding, it is understood that certain changes and modifications may be made within the spirit of the invention and the scope of the appended claims.

What is claimed, is:

1. In a tramway system having a drive wheel and a haul rope trained over and moved by the wheel, a plurality of gripping units arranged about the periphery of the wheel, each of said gripping units comprising a channel arranged transversely of said wheel with its web fixedly mounted on the periphery of the wheel, a pair of parallel spaced pins extending across and fixedly supported in the walls of the channel, a pair of jaw-members each rotatably supported on one of said pins, a jaw lining removably secured on one end of each of said jaw members, said one end of each of the jaw members being formed with a groove and a cutout extending through the bottom wall of said groove, said linings being adapted to conformably seat in said grooves in abutting engagement with the bottom walls thereof, a boss on each of said linings and conformably received within said cutouts to thereby properly position each of said linings with respect to its associated jaw member and transmit the gripping force reaction to the latter and a spring urged plunger radially projecting from the periphery of the wheel and simultaneously engaging each of the jaw linings for normally urging said linings away from the periphery of the wheel and away from each other, said rope being engageable between said linings for moving the latter toward said periphery of the wheel and toward each other into firmly engaging relation with respect to said rope.

2. A rope gripping unit according to claim 1, in combination with a fastener element extending spacedly through each of said jaw members and secured in the associated lining, whereby said linings are held in proper position with respect to said jaw members and said fastener elements are free of stress from the gripping force reaction.

3. In combination with a drive wheel and a haul rope of a tramway system; means for gripping the haul rope which is trained over and moved by the drive wheel, said means including a plurality of rope gripping units arranged about the periphery of the wheel, said units each comprising a pair of complemental jaw members adapted to be pivotally carried by the wheel at one of their ends and having free ends disposed in spaced confronting relation, each of said free ends having a groove with a bottom wall and a cutout in the bottom wall, linings removably secured on said free ends and having faces snugly fitting in the grooves and abutting the bottom walls thereof in force transmission relation with the jaw members, each of said faces having a boss disposed in the cutouts and spaced from the bottom walls thereof, each of said jaw members having an aperture extending through the bottom wall of the cutout and each of said bosses of the linings having a threaded opening smaller in diameter than the apertures and registrable therewith and fasteners disposed through the apertures in spaced relation thereto and threaded in the openings.

4. The combination of claim 3, wherein each of said jaw members has a large opening behind the bottom wall of the cutout to provide access to the fasteners for removal thereof to remove the linings.

5. In a tramway system having a drive wheel and a haul rope trained over and moved by the wheel, a plurality of gripping units arranged about the periphery of the wheel, each of said gripping units comprising a channel shaped housing member arranged transversely of said wheel with its web fixedly mounted on the periphery of the wheel, a pair of parallel spaced pins extending across and fixedly supported in the walls of the channel, a pair of jaw-members each rotatably supported on one of said pins, a jaw lining removably secured on one end of each of said jaw members, said one end of each of the jaw members being formed with a groove and a cutout extending through the bottom wall of said groove, said linings being adapted to conformably seat in said grooves in abutting engagement with the bottom walls thereof, a boss on each of said linings and conformably received within said cutouts to thereby properly position each of said linings with respect to its associated jaw member and transmit the gripping force reaction to the latter, and a spring urged plunger radially projecting from the periphery of the wheel and simultaneously engaging each of the lined jaws for normally urging said lined jaws away from the periphery of the wheel and away from each other, said rope being engageable between said lined jaws for moving the latter toward said periphery of the wheel and toward each other into firmly engaging relation with respect to said rope.

References Cited in the file of this patent

UNITED STATES PATENTS

| | | |
|---|---|---|
| 1,847,982 | Robina | Mar. 1, 1932 |
| 2,492,558 | Deubler | Dec. 27, 1949 |